United States Patent [19]
Jones

[11] 3,867,360
[45] Feb. 18, 1975

[54] NOVEL ISOTHIOCYANATE POLYMERS
[75] Inventor: Giffin D. Jones, Midland, Mich.
[73] Assignee: The Dow Chemical Company, Midland, Mich.
[22] Filed: Nov. 3, 1972
[21] Appl. No.: 303,646

[52] U.S. Cl. ......... 260/79.7, 8/115.5, 260/77.5 AT, 260/77.5 CH, 260/80 NC, 260/92.3, 260/DIG. 4
[51] Int. Cl....... C08f 27/08, C08f 15/00, C08f 3/32
[58] Field of Search ... 260/79.7, 79.5 NV, 77.5 AT, 260/80 NC

[56] References Cited
UNITED STATES PATENTS
2,781,331  2/1957  Jones .................................. 260/63

Primary Examiner—Christopher A. Henderson
Attorney, Agent, or Firm—L. Wayne White

[57] ABSTRACT

Novel vinyl addition polymers are disclosed which comprise at least 0.5 mole percent of moieties of the formula

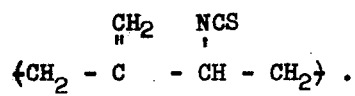

The novel polymers are prepared by reacting homo- and interpolymers of 2-chloromethyl-1,3-butadiene with a thiocyanate salt (e.g. ammonium thiocyanate).

8 Claims, No Drawings

NOVEL ISOTHIOCYANATE POLYMERS

BACKGROUND OF THE INVENTION

2-Chloromethyl-1,3-butadiene is a known compound. Vinyl addition homo- and interpolymers thereof are likewise well known, as illustrated for example by Jones et al. in U.S. Pat. 3,544,532. Such polymers contain the 2-chloromethyl-1,3-butadiene in polymerized form as a unit of the formula

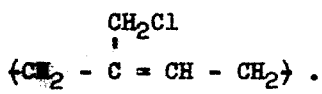

The vinyl addition polymers of 2-chloromethyl-1,3-butadiene are used as reactants in preparing the novel class of polymers hereafter described.

SUMMARY OF THE INVENTION

I have discovered a novel class of polymers. They are characterized in that they are vinyl addition polymers comprising at least 0.5 mole percent of polymerized moieties of the formula

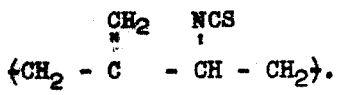

I

The polymers are normally solid material at ambient temperatures and are useful binders for preparing non-woven fabrics and as complexing agents for metal ions, such as mercury, copper, etc.

The novel polymers can be cross-linked (cured) with a variety of cross-linking agents. E.g. suitable cross-linking agents include polyfunctional compounds which react with the isothiocyana to groups on the polymer, such as the polyols (ethylene glycol, glycerol, polyethylene glycol, bisphenol A, etc.), polyamines (ethylenediamine, diethylenetriamine, polyethylenimine, etc.), and other such polyfunctional compounds. A tertiary amine or organotin catalyst is preferably used to accelerate the curing reaction when an aliphatic polyol is used as the cross-linking agent. The polymers can also be cross-linked by post reaction with a vinyl monomer such as vinyl acetate, vinyl chloride or methyl acrylate, or by compounds bearing two types of functionality (ar-vinylbenzylamine, etc.).

Alternatively, the polymers can be used as cross-linking agents for polymers bearing groups which react with isothiocyanato moieties. E.g. acrylamide copolymers containing amino groups (acrylamide/aminoethyl acrylate or methacrylate interpolymers for example), hydroxyl groups (acrylamide/hydroxyethyl acrylate or methacrylate interpolymers for example) and/or carboxyl groups (acrylamide/acrylic or methacrylic acid interpolymers for example).

The cross-linked polymers can be molded, shaped, etc. into many useful articles.

The novel polymers are conveniently prepared by reacting in solution a thiocyanate salt with a vinyl addition homopolymer of interpolymer of 2-chloromethyl-1,3-butadiene, which polymers are in turn prepared using the appropriate monomer(s) via conventional techniques as taught by C. E. Schildknecht in "Polymer Processes," Interscience Publishers, Inc., N. Y. (1956), Volume X of the "High Polymer" series. The results of reacting a thiocyanate salt with polymers of 2-chloromethyl-1,3-butadiene were most surprising since one would have expected that the allylic chlorine atoms on the polymer would be merely replaced by the thiocyanato group in a conventional displacement reaction giving the organic thiocyanate.

The thiocyanato salt(s) used in the reaction may be varied to convenience but alkali metal (Li, Na, K, etc.) or ammonium salts are normally used. Sufficient thiocyanate salt is used to give at least 0.5 mole percent of I in the polymer. The polymers of 2-chloromethyl-1,3-butadiene used in the reaction include naturally the homopolymer thereof as well as interpolymers thereof containing up to 99.5 mole percent of a copolymerizable vinyl monomer(s), such as a vinyl aromatic monomer (e.g. styrene, $\alpha$-methylstyrene, vinyl toluene, ar-t-butylstyrene, ar-chlorostyrene, ar,ar-dichlorostyrene, ar-bromostyrene, vinyl naphthalene, and the like); conjugated diolefins (e.g. butadiene, 2-chloromethylbutadiene, chloroprene, isoprene, 2,3-dimethyl-1,3-butadiene, and the like); alkyl, hydroxyalkyl and protonated aminoalkyl esters of $\alpha,\beta$-ethylenically unsaturated carboxylic acids (e.g. the methyl, ethyl, propyl, butyl, hydroxyethyl, 2-hydroxypropyl, 2-hydroxybutyl, protonated 2-aminoethyl and 2-aminopropyl acrylates, methacrylates, maleates, itaconates, fumarates, and the like); $\alpha,\beta$-ethylenically unsaturated carboxamides (e.g. acrylamide, N-methylolacrylamide, methacrylamide, and the like); $\alpha,\beta$-ethylenically unsaturated nitriles (e.g. acrylonitrile, methacrylonitrile, fumaronitrile, and the like); vinyl chloride, vinylidene chloride; and other such vinyl monomers or a mixture thereof. It will be understood by those skilled in the art that if vinyl chloride is chosen as a comonomer it must be part of a ternary monomer system and will be included in minor amounts in the polymer. For example, cross-linkable sarans can be formed by polymerizing vinylidene chloride, 2-chloromethyl-1,3-butadiene and a minor amount (e.g. up to about 30 mole percent) of vinyl chloride and reacting the resulting polymer with ammonium thiocyanate. Preferred polymeric reactants (and thus preferred polymers within the generic concept) are homopolymers of 2-chloromethyl-1,3-butadiene or interpolymers thereof with styrene, butadiene, isoprene, a lower alkyl acrylate or methacrylate or acrylonitrile. The homopolymer of 2-chloromethyl-1,3-butadiene is most preferred. Suitable such polymeric reactants vary in length from oligomers on up to high molecular weight polymers having average molecular weights of several thousand. It is within the skill of the art to prepare such polymeric reactants having any desired molecular weight range.

DETAILED DESCRIPTION OF THE INVENTION

The following examples will further illustrate the invention.

EXAMPLE 1

2-Chloromethyl-1,3-butadiene (110.0 g.), isoprene (104.3 g.), water (45.0 g.), azo-bis-isobutyronitrile (AIBN - 0.22 g.), t-dodecylmercaptan (0.15 g.) and dodecyltrimethylammonium chloride (0.11 g.) were shaken in a sealed ampule for two days at 60°C. The interpolymer thus formed was precipitated with methanol and recovered by filtration. It contained 19.7 percent chlorine (corresponding to 57 mole percent 2-chloromethyl-1,3-butadiene).

A 6 g. portion of the above interpolymer was dissolved in dioxane (50 ml.) and shaken with ammonium thiocyanate (5 g.) overnight at ambient temperature. The polymer thus produced was precipitated with methanol and recovered by filtration. It contained 6.1 percent sulfur (15.8 percent sulfur is the theoretical maximum) and contained several interpolymerized units corresponding to I. A nonwoven fabric was treated with a solution containing 1 percent by weight of this novel polymer in dioxane and a trace amount of KOH in methanol. The fabric thus treated was warmed for 30 minutes at 100°C. The add-on (weight increase) was 27 percent. The fabric was not noticeably stiffened but was strengthened, as shown by the data in Table I.

Table I

| | Machine Direction | | Cross Direction | |
|---|---|---|---|---|
| Ex. | Tensile Strength, psi | Elongation, % | Tensile Strength, psi | Elongation, % |
| 1 | 1923 | 7.2 | 83.5 | 17 |
| blank | 307 | 4.0 | 5.3 | 49.3 |

The "blank" was untreated fabric.

Another portion of the above interpolymer was slurried with water bearing trace amounts of mercury salts. The interpolymer complexed the mercury ions and lowered the concentration of mercury ions in the water to extremely low concentrations. Thus, the novel polymers are useful in recovering metal values from aqueous streams and in purifying waters polluted with heavy metal ions.

EXAMPLE 2

A homopolymer of 2-chloromethyl-1,3-butadiene was likewise reacted with ammonium thiocyanate. Thiourea and a thiocarbazide derivative of this polymer were prepared by merely contacting portions of the solid polymer with gaseous ammonia and hydrazine, respectively. These derivatives and the initial isothiocyanato polymer were each very efficient in complexing and removing mercury ions from aqeuous solution.

I claim:

1. A vinyl addition polymer comprising at least 0.5 mole percent of polymerized moieties of the formula

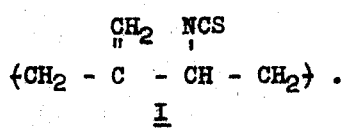

2. The polymer defined by claim 1 wherein said polymer comprises at least about 75 mole percent of I.

3. The polymer defined by claim 1 wherein said polymer is an interpolymer comprising in polymerized form up to 99.5 mole percent of at least one monomer selected from the group consisting of: a vinyl aromatic monomer; a conjugated diolefin; an alkyl, hydroxyalkyl or protonated aminoalkyl ester of an α, β-ethylenically unsaturated carboxylic acid; an α, β-ethylenically unsaturated carboxamide; or an α, β-ethylenically unsaturated nitrile; vinyl chloride and vinylidene chloride with the proviso that if vinyl chloride is selected, said polymer is an interpolymer comprising in polymerized form at least 0.5 mole percent of I, a major amount of vinylidene chloride and up to about 30 mole percent of vinyl chloride.

4. The polymer defined by claim 3 wherein said polymer is an interpolymer comprising in polymerized form up to 99.5 mole percent of styrene, 2-chloromethyl-1,3-butadiene, butadiene, isoprene, a lower alkyl acrylate or methacrylate or acrylonitrile.

5. The polymer defined by claim 4 wherein said polymer is an interpolymer comprising in polymerized form up to 99.5 mole percent of 2-chloromethyl-1,3-butadiene.

6. The vinyl addition polymer defined by claim 1 which is a homopolymer having repeating units of I.

7. The vinyl addition defined by claim 1 which, exclusive of terminal groups, consists of units of I and in polymerized form at least one monomer selected from the group consisting of: 2-chloromethyl-1,3-butadiene; a vinyl aromatic monomer; a conjugated diolefin; an alkyl, hydroxyalkyl or protonated aminoalkyl ester of an α, β-ethylenically unsaturated carboxylic acid; an α, β-ethylenically unsaturated carboxamide; or an α, β-ethylenically unsaturated nitrile; vinyl chloride and vinylidene chloride with the proviso that if vinyl chloride is selected, said polymer is an interpolymer comprising in polymerized form at least 0.5 mole percent of I, a major amount of vinylidene chloride and up to about 30 mole percent of vinyl chloride.

8. The vinyl addition polymer defined by claim 1 which, exclusive of terminal groups, consists of units of I and in polymerized form at least one monomer selected from the group consisting of: styrene, 2-chloromethyl-1,3-butadiene, butadiene, isoprene, a lower alkyl acrylate and methacrylate or acrylonitrile.

* * * * *